No. 895,317. PATENTED AUG. 4, 1908.
S. J. VASALY.
FRUIT JAR COVER.
APPLICATION FILED AUG. 27, 1906.

Witnesses: Spirit Jacob Vasaly
Inventor:

UNITED STATES PATENT OFFICE.

SPIRIT JACOB VASALY, OF LITTLE FALLS, MINNESOTA.

FRUIT-JAR COVER.

No. 895,317.  Specification of Letters Patent.  Patented Aug. 4, 1908.

Application filed August 27, 1906. Serial No. 332,228.

*To all whom it may concern:*

Be it known that I, SPIRIT JACOB VASALY, a citizen of the United States, and a resident of Little Falls, in the county of Morrison and State of Minnesota, have invented an Improvement in Fruit-Jar Covers, of which the following is a specification.

By my invention I provide an elastic and secure air-tight, detachable cover for fruit and other preserve jars. The details of construction and combination of parts are as hereinafter described, and illustrated in the accompanying drawing, in which—

Figure 1:
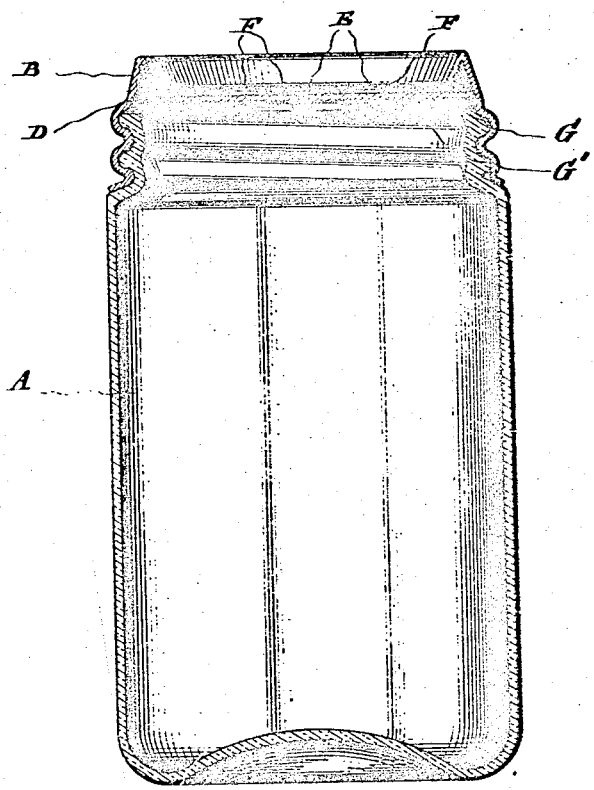
Figure 2:
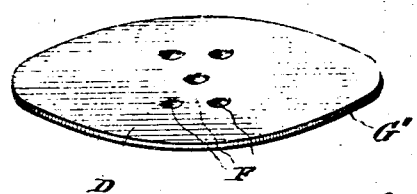

Figure 1 is a central longitudinal section of a jar provided with my improved attachment: Fig. 2 is a perspective view of the cover proper.

The top portion of the glass jar body A is shown reduced in diameter and provided with exterior screwthreads adapted to receive and duly engage the pendent flange of the annular metal cover B. The cover proper is a disk or flat plate, D, whose diameter is slightly less than the diameter of the screwthreaded top portion of the jar A. This disk rests upon a rubber gasket G, which in turn rests upon the top edge of the jar proper. The part B constitutes a cover-securer, although forming itself a part of the cover attachment. It is constructed of thin elastic metal, and its upper portion is bent or curved downwardly and inwardly and its edge inturned and extended laterally so as to lie at an angle to the disk upon the edge of which it bears, the bearing being directly over the gasket G. By this construction the inturned edge constitutes practically a spring of annular form. The gasket G adapts itself to the inequalities of the edge of the jar and the spring cover-securer bears upon the disk, which is thus held upon the gasket with elastic pressure. Thus the rubber gasket and the inturned edge of the part B, by reason of their elasticity, form an elastic and yet secure air-tight closure; yet the part B may be unscrewed and removed without difficulty after air shall have been admitted to the interior of the jar.

It will be understood that a partial vacuum is produced in the jar when its contents cool, and thus the pressure of the atmosphere exterior to the jar is added to that of the part B for holding the disk cover D tightly in place. In order to relieve the vacuum when it is desired to remove the cover, I provide the latter with a series of holes F—see Fig. 2—which, after the jar has been filled, are closed by means of cement plugs E, the same being enlarged at the top as shown in Fig. 1. The cement being comparatively soft, may be easily removed by means of a knife or other sharp instrument, for the purpose of admitting air to the body of the jar.

The under side of the disk cover D is covered with shellac G' to prevent contact of the contents of the jar with the metal of which the cover is preferably made.

I claim—

A securer for a jar cover which is constructed of metal in annular form and adapted for detachable connection with the jar body, its upper portion being bent inward and downward and the edge inturned and inclined downward at an angle to the horizontal, whereby it is adapted to form a spring bearing for a cover proper, substantially as described.

SPIRIT JACOB VASALY.

Witnesses:
W. W. BERGHEIM,
JULIUS JURGENSON.